(12) United States Patent
Niizuma

(10) Patent No.: US 9,260,029 B2
(45) Date of Patent: Feb. 16, 2016

(54) VEHICLE ELECTRIC POWER SUPPLY SYSTEM

(71) Applicant: Motonao Niizuma, Tokyo (JP)

(72) Inventor: Motonao Niizuma, Tokyo (JP)

(73) Assignee: IHI CORPORATION (JP)

( * ) Notice: Subject to any disclaimer, the term of this patent is extended or adjusted under 35 U.S.C. 154(b) by 0 days.

(21) Appl. No.: 14/684,069

(22) Filed: Apr. 10, 2015

(65) Prior Publication Data

US 2015/0210178 A1 Jul. 30, 2015

Related U.S. Application Data

(63) Continuation of application No. 14/190,654, filed on Feb. 26, 2014, now Pat. No. 9,027,723, which is a continuation of application No. PCT/JP2012/073455, filed on Sep. 13, 2012.

(30) Foreign Application Priority Data

Sep. 16, 2011 (JP) ................................. 2011-203318

(51) Int. Cl.
*B60L 11/18* (2006.01)
*H02J 5/00* (2006.01)

(52) U.S. Cl.
CPC ........... *B60L 11/1838* (2013.01); *B60L 11/182* (2013.01); *H02J 5/005* (2013.01)

(58) Field of Classification Search
CPC .............. B60L 11/182; B60L 11/1831; B60L 11/1837; B60L 11/1803; B60L 11/1816; H02J 7/025; H02J 5/005; Y02T 90/122; Y02T 10/7088; Y02T 10/7005; Y02T 90/125; Y02T 90/14; Y02T 90/128
USPC ...................................................... 191/10, 11
See application file for complete search history.

(56) References Cited

U.S. PATENT DOCUMENTS 5,573,090 A * 11/1996 Ross ................................ 191/10
5,669,470 A * 9/1997 Ross ................................ 191/10
(Continued)

FOREIGN PATENT DOCUMENTS

| CN | 102142708 A | 8/2011 |
| CN | 102170147 A | 8/2011 |

(Continued)

OTHER PUBLICATIONS

International Search Report and Written Opinion mailed Dec. 4, 2012 in corresponding PCT International Application No. PCT/JP2012/073455.

(Continued)

*Primary Examiner* — Jason C Smith
(74) *Attorney, Agent, or Firm* — Ostrolenk Faber LLP

(57) ABSTRACT

The present invention is vehicle electric power supply system (A) that supplies electric power wirelessly to a vehicle (M) that is positioned within an electric power supply area (X). The vehicle electric power supply system (A) has: a power-receiving device (m1) that is provided in the vehicle; a plurality of power-transmitting devices (1*a*1, 1*a*2, 1*a*3, 1*b*1, 1*b*2, 1*b*3, 1*c*1, 1*c*2, 1*c*3) that are provided at mutually different positions within the electric power supply area; a position detecting device (4) that detects the position of the power-receiving device within the electric power supply area; and a control device (4) that, based on detection results from the position detecting device, selects from among the plurality of power-transmitting devices the power-transmitting device that is located in a position that corresponds to the power-receiving device, and then causes power to be supplied wirelessly from the selected power-transmitting device.

6 Claims, 3 Drawing Sheets

(56) References Cited

U.S. PATENT DOCUMENTS

| | | | | |
|---|---|---|---|---|
| 6,651,566 | B2* | 11/2003 | Anderson et al. | 104/288 |
| 8,240,406 | B2* | 8/2012 | Stoicoviciu et al. | 180/2.1 |
| 8,292,052 | B2* | 10/2012 | Bohori et al. | 191/10 |
| 8,418,823 | B2* | 4/2013 | Matsumura | 191/10 |
| 8,827,058 | B2* | 9/2014 | Vollenwyder et al. | 191/10 |
| 2005/0178632 | A1* | 8/2005 | Ross | 191/10 |
| 2011/0163542 | A1* | 7/2011 | Farkas | 290/2 |
| 2011/0198176 | A1* | 8/2011 | Meins et al. | 191/10 |
| 2011/0253495 | A1* | 10/2011 | Vollenwyder et al. | 191/10 |
| 2011/0315496 | A1* | 12/2011 | Bohori et al. | 191/10 |
| 2012/0103741 | A1* | 5/2012 | Suh et al. | 191/10 |
| 2012/0186927 | A1* | 7/2012 | Suh et al. | 191/10 |
| 2013/0098723 | A1* | 4/2013 | Cho et al. | 191/10 |
| 2013/0233663 | A1* | 9/2013 | Czainski et al. | 191/10 |
| 2014/0015312 | A1* | 1/2014 | Niizuma | 307/9.1 |
| 2014/0138199 | A1* | 5/2014 | Ichikawa et al. | 191/10 |
| 2014/0151175 | A1* | 6/2014 | Vietzke | 191/10 |
| 2014/0174870 | A1* | 6/2014 | Niizuma | 191/10 |
| 2014/0217966 | A1* | 8/2014 | Schneider et al. | 320/108 |
| 2014/0225434 | A1* | 8/2014 | Niizuma | 307/10.1 |
| 2014/0238804 | A1* | 8/2014 | Vietzke et al. | 191/10 |
| 2014/0292266 | A1* | 10/2014 | Eger et al. | 320/108 |

FOREIGN PATENT DOCUMENTS

| | | |
|---|---|---|
| JP | 2006-166570 | 6/2006 |
| JP | 2006-288034 | 10/2006 |
| JP | 2008-88889 | 11/2008 |
| JP | 2008-288889 | 11/2008 |
| JP | 2010-193657 | 9/2010 |
| JP | 2010-220284 | 9/2010 |
| JP | 2010-246348 | 10/2010 |
| JP | 2010-268661 | 11/2010 |
| WO | WO 2009/054221 A1 | 4/2009 |

OTHER PUBLICATIONS

Office Action dated Oct. 16, 2014 in parent U.S. Appl. No. 14/190,654, filed Feb. 26, 2014.

Office Action dated Jun. 9, 2015 issued in corresponding Japanese Patent Application No. 2011-203318 with English translation.

Office Action dated Jun. 19, 2015 issued in corresponding Chinese Patent Application No. 201280044590.7 with English translation of Search Report only.

* cited by examiner

VEHICLE ELECTRIC POWER SUPPLY SYSTEM

CROSS REFERENCE TO RELATED APPLICATIONS

The present patent application is a continuation under 37 C.F.R. §1.53(b) of, and claims priority to, prior U.S. patent application Ser. No. 14/190,654, filed Feb. 26, 2014, by Motonao Niizuma, entitled "VEHICLE ELECTRIC POWER SUPPLY SYSTEM," which is a continuation of International Application No. PCT/JP2012/073455, filed Sep. 13, 2012, claiming priority to Japanese Patent Application No. 2011-203318, filed Sep. 16, 2011. The contents of each of the patent applications above-listed are incorporated in full herein by reference.

TECHNICAL FIELD

The present invention relates to a vehicle electric power supply system.

TECHNICAL BACKGROUND

It is sometimes difficult for vehicles such as hybrid vehicles and electric vehicles to travel long distances because of problems such as the performance of the mounted batteries and the like. Because of this, in recent years, in addition to supplying electric power to such batteries at users' homes and the like, it has been proposed that electric power supply areas be provided in a variety of locations along routes traveled by vehicles such as, for example, road stops, gas stations, hill slopes, and intersections and the like. For example, in Patent document 1 a vehicle electric power supply system is disclosed that supplies power wirelessly to a vehicle by utilizing traffic signals.

DOCUMENTS OF THE PRIOR ART

PATENT DOCUMENTS

[Patent document 1] Japanese Patent Application First Publication No. 2010-193657

DISCLOSURE OF THE INVENTION

Problems to be Solved by the Invention

When electric power is being supplied wirelessly, the positional relationship between the power-receiving device provided in the vehicle and the power-transmitting device provided within the electric power supply area affects the efficiency of the electric power supply. For example, in locations where the position of the vehicle is more or less fixed, such as the parking space of a private home, there is no problem with the electric power supply efficiency. However, as in the aforementioned conventional technology, when electric power is supplied wirelessly while a vehicle is actually traveling, then it is easy for the position of the vehicle within the electric power supply area to be arbitrarily decided depending on the will of the driver. Because of this, positional mismatching between the power-receiving device and the power-transmitting device increases and this causes the electric power supply efficiency to deteriorate. Moreover, in some cases, the position where the power-receiving device is installed in the vehicle may differ depending on the type of vehicle, i.e., depending on whether the vehicle is a passenger vehicle or a truck or the like. Because of this, positional mismatching between the power-receiving device and the power-transmitting device increases and cases such as this also cause the electric power supply efficiency to deteriorate.

The present invention was conceived in view of the above-described problems and it is an object thereof to provide a vehicle electric power supply system that is able to suppress any deterioration in the electric power supply efficiency.

Means for Solving the Problem

The present invention employs the following structure as a means of solving the above-described problems. A first aspect of the present invention is a vehicle electric power supply system that supplies electric power wirelessly to a vehicle that is positioned within an electric power supply area. This vehicle electric power supply system has a power-receiving device that is provided in the vehicle; a plurality of power-transmitting devices that are provided at mutually different positions within the electric power supply area; a position detecting device that detects the position of the power-receiving device within the electric power supply area; and a control device that, based on detection results from the position detecting device, selects from among the plurality of power transmitting devices the power-transmitting device that is located in a position that corresponds to the power-receiving device, and then causes power to be supplied wirelessly from the selected power-transmitting device.

A second aspect of the present invention is the vehicle electric power supply system according to the above-described first aspect in which, based on the detection results from the position detecting device, the control device selects from among the plurality of power-transmitting devices the power-transmitting device that is located in the closest position to the power-receiving device, and then causes power to be supplied wirelessly from the selected power-transmitting device.

A third aspect of the present invention is the vehicle electric power supply system according to the above-described first or second aspects in which, when the position detecting device has detected the positions of a plurality of the power-receiving devices within the electric power supply area, then based on the detection results from the position detecting device, the control device selects from among the plurality of power-transmitting devices the respective power-transmitting devices that are placed in positions that correspond to each one of the plurality of power-receiving devices, and causes power to be supplied wirelessly from the selected power-transmitting devices.

A fourth aspect of the present invention is the vehicle electric power supply system according to any one of the above-described first through third aspects in which the power-transmitting devices are provided with power-transmitting coils, and the power-receiving devices are provided with power-receiving coils, and the power-transmitting devices transmit power wirelessly by causing their power-transmitting coils to be electromagnetically coupled with the power-receiving coils.

A fifth aspect of the present invention is the vehicle electric power supply system according to the above-described fourth aspect in which the power-transmitting coils and the power-receiving coils are used as the position detecting device.

Effects of the Invention

According to the present invention, a plurality of power-transmitting devices are provided within an electric power supply area, and the position of a power-receiving device provided in the vehicle within the electric power supply area is detected. By doing this, it is possible to select from the plurality of power-transmitting devices the power-transmitting device that is located in the optimum position to supply electric power wirelessly, and to supply electric power using the selected power-transmitting device. As a result, it is possible to suppress any deterioration in the electric power supply efficiency.

BEST EMBODIMENTS FOR IMPLEMENTING THE INVENTION

Hereinafter, embodiments of the present invention will be described in detail with reference made to the drawings.

Figure 1:
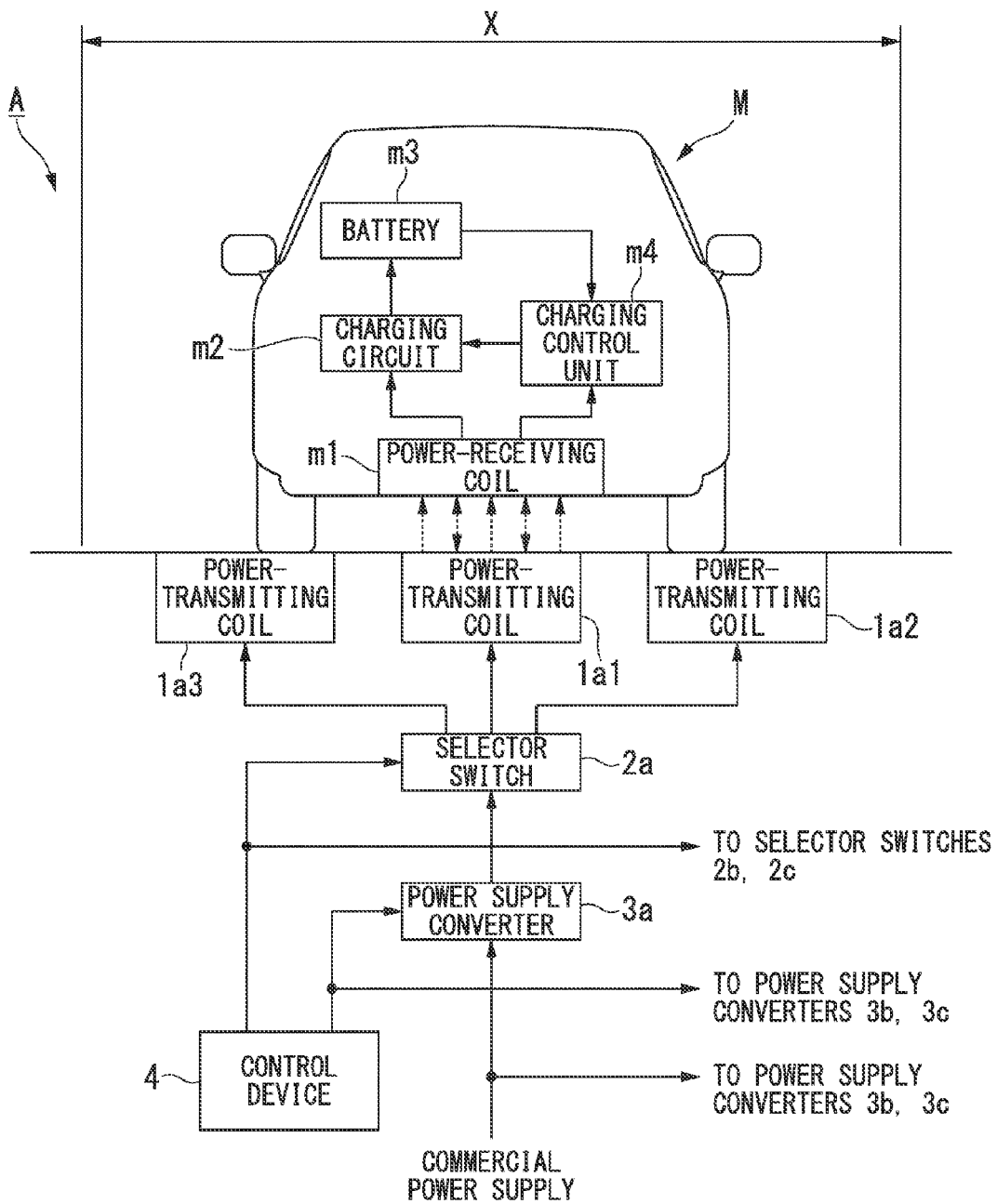
FIG. 1 is a system structure view showing the mechanism structure of a vehicle electric power supply system according to an embodiment of the present invention.

FIG. 1 is a system structure view showing the mechanism structure of a vehicle electric power supply system according to an embodiment of the present invention. As is shown in FIG. 1, this vehicle electric power supply system A supplies electric power wirelessly to a vehicle M that is positioned within an electric power supply area X. A plurality of power-transmitting coils (i.e., power-transmitting devices) $1a1$, $1a2$, and $1a3$ are provided within the electric power supply area X. A power-receiving coil (i.e., a power-receiving device) $m1$ is provided in the vehicle M.

The power-receiving coil $m1$ is provided in a bottom portion of the vehicle M such that the power-receiving coil will face towards the power-transmitting coil $1a1$ and the like. The power-receiving coil $m1$ has substantially the same coil diameter as the power-transmitting coil $1a1$ and the like, and receives AC power wirelessly by being electromagnetically coupled to the power-transmitting coil $1a1$ and the like. In other words, the vehicle electric power supply system A is a power supply system in which power is supplied wirelessly to the vehicle M as a result of the power-transmitting coil $1a1$ and the like being electromagnetically coupled to the power-receiving coil $m1$ of the vehicle M.

The supplying of power wirelessly from the power-transmitting coil $1a1$ and the like in the vehicle electric power supply system A to the power-receiving coil $m1$ is performed based on magnetic resonance. Namely, a resonance capacitor (not shown) that forms part of a resonance circuit is connected to both the power-transmitting coil $1a1$ and the like and the power-receiving coil $m1$. For example, the electrostatic capacitance of the resonance capacitor is set such that the resonance frequency of the resonance circuit on the power supply side, which is provided with the power-transmitting coil $1a1$ and the like and with the resonance capacitor, be the same as the resonance frequency of the resonance circuit on the power receiving side, which is provided with the power-receiving coil $m1$ and with the resonance capacitor.

In addition to the power-receiving coil $m1$, the vehicle M is provided with a charging circuit $m2$, a battery $m3$, and a charging control unit $m4$. The power-receiving coil $m1$ outputs AC power (i.e. received power) that it has received from the power-transmitting coil $1a1$ to the charging circuit $m2$. The charging circuit $m2$ is a power conversion circuit (i.e., a converter) that, based on charging control signals that the charging circuit $m2$ receives from the charging control unit $m4$, converts the received power into DC power that it then supplies to the battery $m3$. Namely, based on the charging control signals, the charging circuit $m2$ charges the battery $m3$ by supplying charging current to the battery $m3$ in accordance with the charged state of the battery $m3$.

The battery $m3$ is the source of drive power for the vehicle M. The battery $m3$ is a rechargeable battery that is capable of storing sufficient power and, for example, is a lithium-ion rechargeable battery or a nickel-hydrogen rechargeable battery or the like. The battery $m3$ is charged by the DC current supplied from the charging circuit $m2$, and also supplies (i.e., discharges) traveling drive power to a drive power converter (not shown). The charging control unit $m4$ is a control device that controls the power conversion operations of the charging circuit $m2$ and controls the charging of the battery $m3$. When the charging control unit $m4$ detects, on the basis, for example, of changes in the voltage between the terminals of the power receiving coil $m1$, that the power-receiving coil $m1$ has received AC power from the power-supply coil $1a1$ and the like, the charging control unit $m4$ causes the charging circuit $m2$ to operate so as to cause the battery $m3$ to be charged with DC power.

The power-transmitting coils $1a1$, $1a2$, and $1a3$ are set in positions that are mutually different from each other within the electric power supply area X, which is a predetermined area that is established on the road surface along which the vehicle M travels. More specifically, the power-transmitting coils $1a1$, $1a2$, and $1a3$ are placed apart from each other in the vehicle transverse direction of the vehicle M. The power-transmitting coil $1a1$ is placed in the center of the road surface, while the power-transmitting coils $1a2$ and $1a3$ are placed on either side of the power-transmitting coil $1a1$ and at a distance therefrom. The power-transmitting coils $1a1$, $1a2$, and $1a3$ are embedded in the road adjacent to the road surface. Note that the number and placement of the power-transmitting coils described above are merely examples thereof, and the present invention is not limited to these examples.

A power supply converter $3a$ is a device that, based on control signals that the power supply converter $3a$ receives from a control device 4 (i.e., position detecting device, control device), supplies AC power to the power-transmitting coil $1a1$ and the like for the power-transmitting coils to use when they supply power. More specifically, the power supply converter $3a$ supplies power supply AC power via a selector switch $2a$ to any one of the power-transmitting coils $1a1$, $1a2$, and $1a3$. The power supply converter $3a$ converts 50 Hz or 60 Hz commercial power into AC power of a frequency that is suitable for supplying power to the vehicle M (for example, between several hundred Hz and several MHz), and then outputs this power to the respective power-transmitting coils $1a1$ and the like.

The selector switch $2a$ is a device that, based on control signals that the selector switch $2a$ receives from the control device 4, switches the circuit that is electrically connected to the power supply converter $3a$. The selector switch $2a$ is designed such that it can be electrically connected to any one of the power-transmitting coils $1a1$, $1a2$, and $1a3$. By providing the selector switch $2a$, it is not necessary to provide a dedicated power supply converter $3a$ for each one of the power-transmitting coils $1a1$, $1a2$, and $1a3$. As a consequence of this, it is possible to increase the functionality and the efficiency of the structural components and control system of the vehicle electric power supply system A.

The control device 4 detects the position of the power-receiving coil m1 within the electric power supply area X and, based on the results of these detections, selects from among the plurality of power-transmitting coils 1a1, 1a2, and 1a3 the power-transmitting coil 1a1 that is located in a position that corresponds to the power-receiving coil m1. The control device 4 then causes power to be supplied wirelessly from the selected power-transmitting coil 1a1. Namely, when the control device 4 detects a position signal for the power-receiving coil m1, the control device 4 switches the selector switch 2a such that the power-transmitting coil 1a1 that is located in the optimum position to supply power wirelessly is selected, and then causes AC power from the power supply converter 3a to be supplied to the selected power-transmitting coil 1a1. This control device 4 corresponds to the position detecting device and control device of the vehicle electric power supply system A.

The control device 4 uses the power-transmitting coil 1a1 and the like and the power-receiving coil m1 as a position detecting device. More specifically, by diverting both the power-transmitting coil 1a1 and the like and the power-receiving coil m1 for the purpose of performing signal transmissions, wireless communication between the control device 4 and the charging control unit m4 is made possible via the power-transmitting coil 1a1 and the like and the power-receiving coil m1. Via this wireless communication, information relating to the position of the power-receiving coil m1 that is installed in the vehicle M is transmitted and received between the control device 4 and the charging control unit m4, and the position of the power-receiving coil m1 within the electric power supply area X is detected. In this case, the power-transmitting coil 1a1 and the like and the power-receiving coil m1 function as an antenna for wireless communication, and the control device 4 and the charging control unit m4 function as communication devices that employ this antenna. This wireless communication can also be used to determine the stopped state of the vehicle M within a stopping area, or to verify before a power supply commences whether or not it is necessary for power to actually be supplied, or to transmit and receive transaction fee information relating to the supplying of power.

The control device 4 may detect the position of the power-receiving coil m1 within the electric power supply area X based on the amount of charged power per unit time that is stored in the battery m3. For example, in order to seek the position of the power-receiving coil m1, the control device 4 switches the selector switch 2a at a regular predetermined interval so as to supply power sequentially to the power-transmitting coils 1a1, 1a2, and 1a3. The charging control unit m4 calculates the amount of charged power per unit time that has been stored in the battery m3 within each of the aforementioned regular predetermined intervals by monitoring the level of the power charge in the battery m3, and then transmits information about the power-transmitting coil having the greatest charging efficiency to the control device 4. In the case of wireless power supply, the smaller the positional mismatching with the power-receiving coil m1, the greater the power supplying efficiency of the power-transmitting coil. Because of this, the control device 4 is able to detect the position of the power-receiving coil m1 from the above-described information (namely, the information about the power-transmitting coil having the greatest power supplying efficiency)

Based on the results of the detection of the position of the power-receiving coil m1, the control device 4 selects from among the plurality of power-transmitting coils 1a1, 1a2, and 1a3 the power-transmitting coil 1a1 that is located in a position that corresponds to the power-receiving coil m1, and causes power to be supplied wirelessly from this selected power-transmitting coil 1a1. More specifically, when the control device 4 acquires via wireless communication with the charging control unit m4 information relating to the position of the power-receiving coil m1 that is installed in the vehicle M, the control device 4 associates the position information for the power-receiving coil m1 with the placement information for the power-transmitting coil 1a1 and the like that has been stored in it in advance, and then selects the power-transmitting coil (i.e., the power-transmitting coil 1a1) that is located closest to the power-receiving coil m1. Moreover, when the control device 4 has acquired information relating to the position of the power-receiving coil m1 based on the amount of charged power per unit time that has been stored in the battery m3, then the control device 4 simply selects the power-transmitting coil (i.e., the power-transmitting coil 1a1) that has the greatest power supply efficiency.

Figure 2:
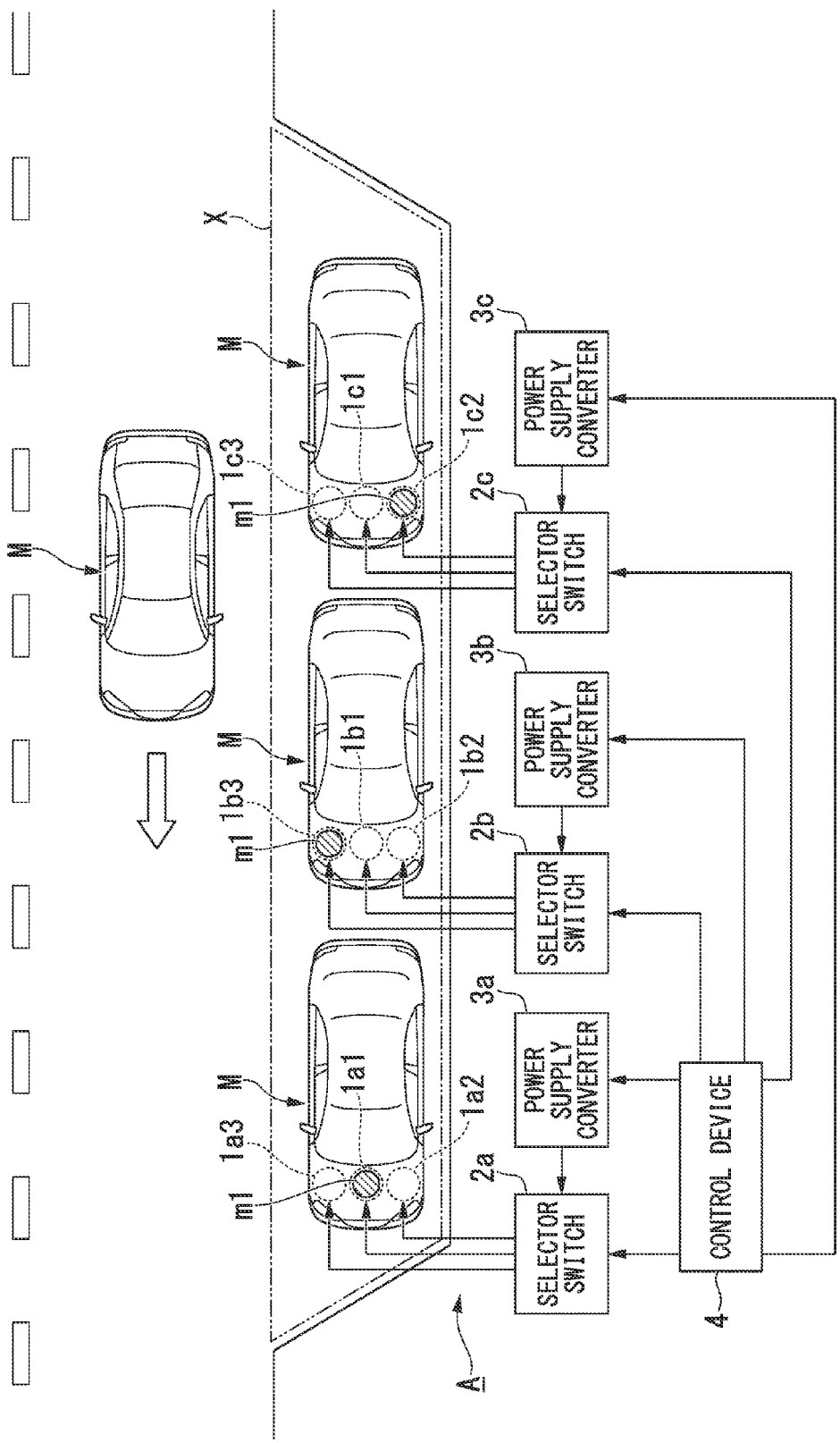
FIG. 2 is a typical view showing an example of the layout of a vehicle electric power supply system according to an embodiment of the present invention.

FIG. 2 is a typical diagram showing an example of the layout of the vehicle electric power supply system A of an embodiment of the present invention. FIG. 2 shows a case in which the electric power supply area X of this vehicle electric power supply system A is established, for example, in a vehicle stopping bay on a road. This electric power supply area X is set to a size that enables a plurality of vehicles M to be able to stop therein (for example, to a size that enables three passenger vehicles to stop therein), and such that any type of vehicle M that travels along the road is able to stop therein. For example, as is shown in FIG. 2, the position of the power-receiving coil m1 in the foremost vehicle M and the positions of the power-receiving coils m1 in the vehicles M behind that vehicle are mutually different from each other.

In addition to the power-transmitting coils 1a1, 1a2, and 1a3, power-transmitting coils 1b1, 1b2, and 1b3 and power-transmitting coils 1c1, 1c2, and 1c3 are also provided in the electric power supply area X. Note that the number and placement of these power-transmitting coils are merely examples thereof, and the present invention is not limited to these examples. For example, in the case of an electric power supply area X that is formed in a road stopping bay, it is also possible for a plurality of power-transmitting coils to be arranged at predetermined spacings in a matrix layout. Moreover, a selector switch 2b and a power supply converter 3b that correspond to the power-transmitting coils 1b1, 1b2, and 1b3, and a selector switch 2c and a power supply converter 3c that correspond to the power-transmitting coils 1c1, 1c2, and 1c3 are each provided in the electric power supply area X, and these are electrically connected to the control device 4.

When the control device 4 has detected the positions of the plurality of power-receiving coils m1 within the electric power supply area X using the above-described position detecting device, then based on the results of this position detection, the control device 4 selects from among the plurality of power-transmitting coil 1a1 and the like the respective power-transmitting coils (namely, the power-transmitting coil 1a1, the power-transmitting coil 1b3, and the power-transmitting coil 1c2 in FIG. 2) that are located in positions that correspond to each of the plurality of power-receiving coils m1, and then causes power to be supplied wirelessly from the selected power-transmitting coils. As a result of this, power can be wirelessly supplied simultaneously to the plurality of vehicles M that are positioned within the electric power supply area X.

An operating sequence of the vehicle electric power supply system A having the above-described structure will be described below. In the vehicle electric power supply system A, the electric power supply area X is set within a vehicle stopping bay on a road. Accordingly, because the position where a vehicle M stops within the electric power supply area X depends on the driving action of the driver, these stopping positions are not consistently the same. Moreover, because any type of vehicle M that is traveling along the road is able to stop in the electric power supply area X, the positions of the power-receiving coils m1 in the vehicles M are different in each vehicle M.

The AC power that is transmitted wirelessly from the power-transmitting coil 1a1 and the like to the power-receiving coil m1 is at its maximum when the power-receiving coil m1 is directly above and facing directly towards the power-transmitting coil 1a1 and the like, namely, when the power-receiving coil m1 and the power-transmitting coil 1a1 and the like are at their closest to each other. However, because of the circumstances described above, the power-receiving coil m1 cannot be expected to be situated so as to face directly towards a predetermined power-transmitting coil 1a1 and the like. In other words, the relative positions between a power-receiving coil m1 and a predetermined power-transmitting coil 1a1 or the like will not always be the same because of the inconsistent stopping positions of the vehicle M. Because of this, in the vehicle electric power supply system A, the plurality of power-transmitting coils 1a1 and the like are installed in mutually different positions within the electric power supply area X.

The control device 4 constantly monitors whether or not a vehicle M is within the electric power supply area X by attempting to communicate wirelessly with the charging control unit m4 via the power-receiving coil m1 in the vehicle M using the Ser. No. 01/739,832.1) power-transmitting coil 1a1 and the like as an antenna. For example, if there is no communication connection with the charging control unit m4, the control device 4 determines that no vehicle M has stopped within the electric power supply area X. In contrast, if there is a communication connection with the charging control unit m4, the control device 4 determines that a vehicle M has stopped within the electric power supply area X.

When the control device 4 has determined that a vehicle M has stopped within the electric power supply area X, the control device 4 detects the position of the power-receiving coil m1 of the vehicle M. More specifically, information relating to the position of the power-receiving coil m1 that is installed in the vehicle M is transmitted and received by means of wireless communication between the control device 4 and the charging control unit m4 via the power-transmitting coil 1a1 and the like and the power-receiving coil m1, so that the position of the power-receiving coil m1 within the electric power supply area X is detected. Alternatively, the selector switch 2a and the like is switched at regular predetermined intervals such that power is supplied sequentially to the power-transmitting coils 1a1, 1a2, and 1a3, so that the position of the power-receiving coil m1 within the electric power supply area X is detected based on the amount of charged power per unit time that is actually stored in the battery m3.

Alternatively, it is also possible to detect the position of the power-receiving coil m1 within the electric power supply area X using both of these methods. For example, in the case of the second vehicle M shown in FIG. 2, information relating to the position of the power-receiving coil m1 that is installed in the vehicle M is transmitted and received firstly by wireless communication, and approximate position information for the power-receiving coil m1 (i.e., information such as the fact that the power receiving coil m1 is located on the right side of the vehicle body) is exchanged. Next, the position of the power-receiving coil m1 can be detected both accurately and in a short time by comparing the power-transmitting coils 1b1 and 1b2 that correspond to this position of the power-receiving coil m1 with the amount of charged power per unit time that is stored in the battery m3. Namely, compared to the retrieval time when the position of the power-receiving coil m1 is accurately detected by sequentially supplying power to the power-transmitting coils 1b1, 1b2, and 1b3 right from the start, the retrieval time can be shortened by initially narrowing a retrieval range down to a retrieval range that is estimated based on approximate information for the power-receiving coil m1.

After the position of the power-receiving coil m1 within the electric power supply area X has been detected, based on the results of this detection, the control device 4 selects from among the plurality of power-transmitting coils 1a1 and the like the power-transmitting coil 1a1 or the like that is located at a position that corresponds to the power-receiving coil m1, and then causes power to be supplied wirelessly from the selected power-transmitting coil 1a1 and the like. For example, if the control device 4 has detected that the power-receiving coil m1 of the foremost vehicle M shown in FIG. 2 is positioned above or nearly above the power-transmitting coil 1a1, the control device 4 selects this power-transmitting coil 1a1 and, by then switching the selector switch 2a, the control device 4 causes power to be supplied from the power supply converter 3a to the power-transmitting coil 1a1.

The power-receiving coil m1 of the vehicle M is electromagnetically coupled to the power-transmitting coil 1a1. As a result of this, the AC power that is supplied from each power supply converter 3a to the power-transmitting coil 1a1 is wirelessly transmitted from the power-transmitting coil 1a1 to the power-receiving coil m1 of the vehicle M. In the vehicle electric power supply system A, magnetic resonance is used. Because of this, the transmission efficiency of the AC power that is wirelessly transmitted from the power-transmitting coil 1a1 and the like to the power-receiving coil m1 is high.

During the period in which the control device 4 is connected for communication with the charging control unit m4, the control device 4 continues the wireless power supply to the vehicle M via the power-transmitting coil 1a1. When the connection for communication between the control device 4 and the charging control unit m4 is broken off, the control device 4 determines that the vehicle M has moved out of the electric power supply area X and causes the supplying of power to the power-transmitting coil 1a1 to cease. Thereafter, the control device 4 returns to its initial standby state, and monitors whether or not a vehicle M stops within the electric power supply area X.

According to the above-described present embodiment, it is possible to supply power wirelessly for a predetermined time to a vehicle M that has stopped within a stopping bay on a road where an electric power supply area X has been established by utilizing the fact that the vehicle M is stopped. Accordingly, according to the present embodiment, it is possible to supply power to the vehicle M at a particular location partway through the journey of the vehicle M. Namely, it is possible to both encourage the public acceptance of a vehicle M which uses electric power as a travel power source and improve the convenience of the vehicle M.

Moreover, according to the above-described present embodiment, the vehicle electric power supply system A that supplies power wirelessly to a vehicle M that is positioned within the electric power supply area X has a power-receiving coil m1 that is provided in the vehicle M, a plurality of power-transmitting coils 1a1 and the like that are provided at mutually different positions within the electric power supply area X, and a control device 4 that is equipped with a position detecting device that detects the position of the power-receiving coil m1 within the power supply area X, and with a control unit that, based on detection results from this position detecting device, selects from among the plurality of power-transmitting coils 1a1 and the like the power-transmitting coil 1a1 or the like that is located in a position that corresponds to the power-receiving coil m1, and then causes power to be supplied wirelessly from the selected power-transmitting coil 1a1. As a consequence, it is possible to select from among the plurality of power-transmitting coils 1a1 and the like the power-transmitting coil 1a1 or the like that is located in the optimum position for supplying power wirelessly, and to then cause this power-transmitting coil 1a1 or the like to supply power. Accordingly, in the present embodiment, it is possible to achieve a vehicle electric power supply system A that is able to limit any reduction in the power supply efficiency even when a vehicle M is supplied with power wirelessly partway through its journey.

Note that the present invention is not limited to the above-described respective embodiments and, for example, the following variant examples may also be considered.

(1) In the present embodiment, as is shown in FIG. 2, the power-transmitting coils 1a1 and the like, 1b1 and the like, and 1c1 and the like that are located within the power supply area X are embedded in the road at a predetermined distance from each other. However, the present invention is not limited to this. For example, the stopping positions of the vehicles M change depending on the respective sizes (i.e., vehicle lengths) of the foremost vehicle M and the vehicles M to the rear of that vehicle. Because of this, it is also possible for the power-transmitting coils 1a1 and the like of the rearward vehicles M to be embedded in the road surface, for example, at the same distance from each other as the length of the vehicle M having the shortest vehicle length. Furthermore, it is also possible to provide the selector switches 2a and the like and the power supply converters 3a and the like at the same distances from each other respectively as the length of that shortest vehicle M, and to supply power wirelessly at intervals of this vehicle length. If the power-transmitting coils 1a1 and the like, 1b1 and the like, and 1c1 and the like are embedded at these comparatively short intervals, then even if a plurality of vehicles M having mutually different sizes (i.e., vehicle lengths) stop within the power supply area X, it is still possible for power to be supplied to each of these vehicles M. Note that the number of power-transmitting coils 1a1 and the like within the power supply area X is appropriately set in accordance with the location and environment and the like where the power supply area X is established.

(2) In the present embodiment, the power-transmitting coils 1a1 and the like are embedded in the road surface and the power-receiving coils m1 are provided in a base portion of the vehicles M, and the power-transmitting coils 1a1 and the like and the power-receiving coils m1 are placed opposite each other in a vertical direction. However, the present invention is not limited to this. For example, it is also possible for the power-receiving coil m1 to be provided in a side portion (i.e., in an entrance door) of the vehicle M, and for the power-transmitting coil 1a1 and the like to be provided on the shoulder of the road such that its center axis is horizontal and is also orthogonal to the axis of the traffic lane, and such that it faces the side portion (i.e., the entrance door) of the vehicle M. Moreover, it is also possible for the power-receiving coil m1 to be provided in the roof portion of the vehicle M and for the power-transmitting coil 1a1 and the like to be provided above the road so as to face the roof portion of the vehicle M.

Figure 3:
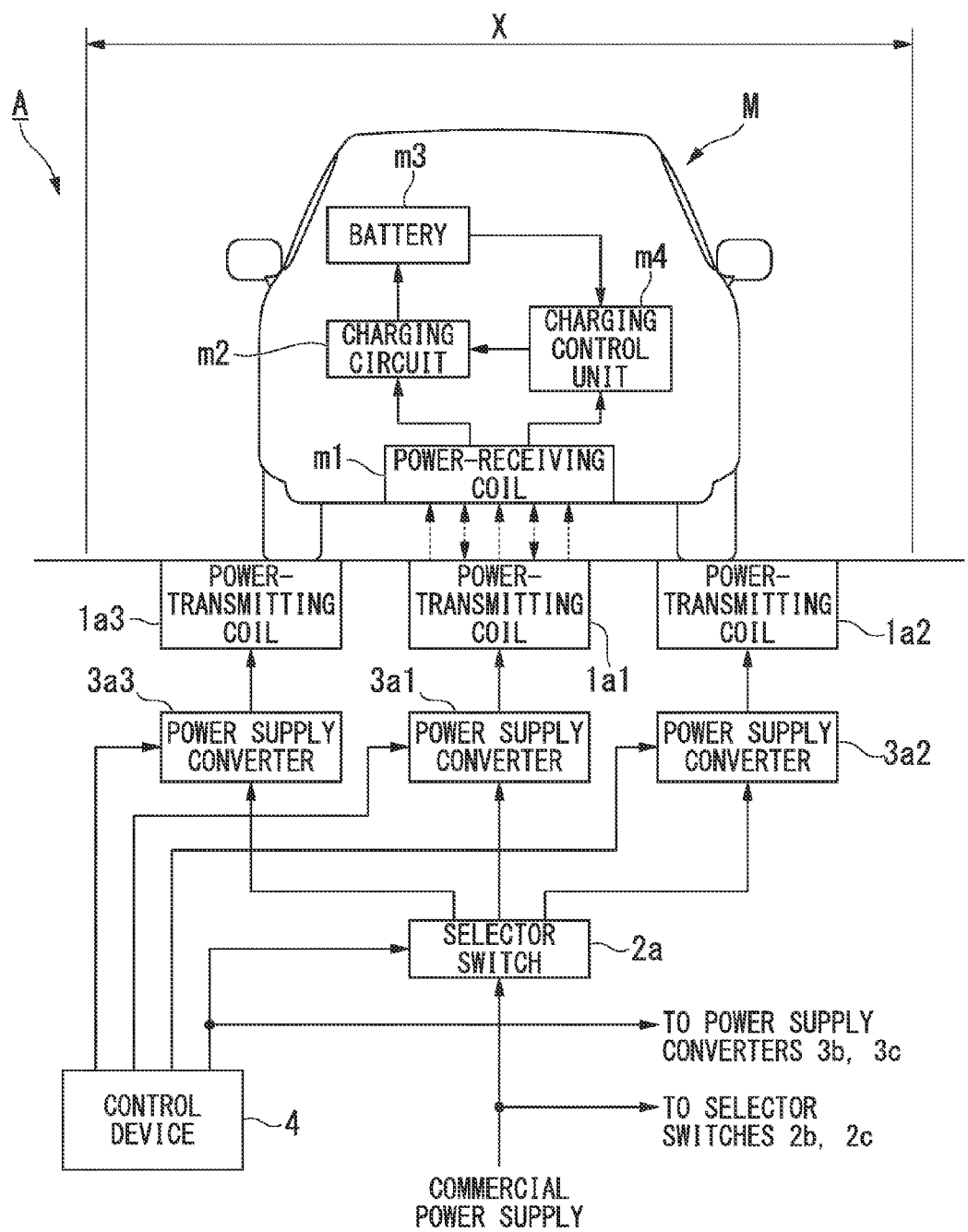
FIG. 3 is a system structure view showing the mechanism structure of a vehicle electric power supply system according to another embodiment of the present invention.

(3) In the present embodiment, as is shown in FIG. 1, the power supply converter 3a supplies the AC power for the power supply to any one of the power-transmitting coils 1a1, 1a2, and 1a3 via the selector switch 2a. However, the present invention is not limited to this. For example, as is shown in FIG. 3, it is also possible for independent power supply converters 3a1, 3a2, and 3a3 to be directly connected to the respective power-transmitting coils 1a1, 1a2, and 1a3, and for the 50 Hz or 60 Hz commercial power that is supplied to each of these power supply converters to be switched by the selector switch 2a.

(4) In the present embodiment, the power-transmitting coils 1a1 and the like and the power-receiving coils m1 are used as the position detecting device. However, the present invention is not limited to this. For example, instead of this, it is also possible for the vehicle electric power supply system A (i.e., the on-ground facility) and the vehicle M to be furnished with their own separate communication functions. For example, the use of known optical beacons or wireless communication instruments that employ radio waves and the like for the separate communication functions may also be considered. However, because it is only necessary for communication between the vehicle electric power supply system A (i.e., the on-ground facility) and the vehicle M, in other words, for communication over a comparatively short distance to be possible, it is also possible to employ individually designed communication systems for the separate communication functions. Moreover, it is also possible to design a system in which the stopping position and stopped state (i.e., attitude) of the vehicle M are detected by measuring the latitude and longitude of the vehicle M via GPS, or by embedding strain gauges in the road and then measuring the load thereon, or by measuring distance using a 3-D laser radar, and in which the position of the power-receiving coil m1 is then detected based on the results from such detections.

(5) In the present embodiment, the position of the power-receiving coil m1 within the electric power supply area X is detected based on wireless communication between the control device 4 and the charging control unit m4 via the power-transmitting coils 1a1 and the like and the power-receiving coil m1, or based on the amount of charged power per unit time that has accumulated in the battery m3, however, the present invention is not limited to this. For example, it is also possible to mount the power-receiving coil m1 in a predetermined position in the vehicle M (for example, in the position of the driver's seat in the front-rear direction, and in the position of the center of the vehicle in the left right direction), and to install 3-D laser radar or a stereo camera in a position that enables it to photograph the entire electric power supply area X (for example, in a position where it looks down diagonally from above over the electric power supply area X). By doing this, it is possible to detect the position of the vehicle from the photographed images by means of three-dimensional shape matching, and to thereby indirectly determine the position of the power-receiving coil m1.

(6) In the present embodiment, the electric power supply area X is established in a vehicle stopping bay on a road. However, the present invention is not limited to this. In addition to a road stopping bay, the various locations where the electric power supply area X can be established include, for example, areas in front of traffic signals that are located on roads (i.e., public roads), areas in front of railway level crossings, carparks in shopping centers, drive-through lanes in stores and the like, and stopping areas in gas stations and the like. Moreover, the present invention is not limited to public roads and private roads and the like, and the electric power supply area X may also be established on private land such as home carparks and the like.

(7) In the present embodiment, power is supplied wirelessly to a vehicle M (i.e., to a stopped vehicle) that is positioned within the electric power supply area X without any preconditions being set. However, the present invention is not limited to this. For example, it is also possible to divert the power-transmitting coils 1a1 and the like and the power-receiving coils m1 for the purpose of performing signal transmissions so as to make wireless communication between the control device 4 and the charging control unit m4 possible, or to use this wireless communication to verify the necessity of supplying power before the supplying of power commences, or to transmit and receive transaction fee information relating to the supplying of power. In this case, the power-transmitting coils 1a1 and the like and the power-receiving coils m1 function as an antenna for this wireless communication, and the control device 4 and the charging control unit m4 function as communication devices that utilize this antenna. Moreover, it is not necessary to divert the power-transmitting coils 1a1 and the like and the power-receiving coils m1 for the purpose of performing signal transmissions, but it is possible to perform wireless communication using separately provided individual communication devices.

(8) In the present embodiment, a case is described in which the power that is supplied to the vehicle M is used to charge the battery m3. However, the present invention is not limited to this. For example, it is also possible for the power that is supplied to the vehicle M to be used to drive illumination devices or air-conditioning devices inside the vehicle M.

INDUSTRIAL APPLICABILITY

According to the present invention, a plurality of electric power supplying devices are provided within an electric power supply area, and the position of a power-receiving device provided in a vehicle within the electric power supply area is detected. By doing this, it is possible to select from the plurality of power-transmitting devices the power-transmitting device that is located in the optimum position to supply electric power wirelessly, and to supply electric power using the selected power-transmitting device. As a result, it is possible to suppress any deterioration in the electric power supply efficiency.

DESCRIPTION OF THE REFERENCE NUMERALS

A . . . Vehicle electric power supply system, M . . . Vehicle, m1 . . . Power-receiving coil (Power-receiving device), X . . . Electric power supply area, 1a1, 1a2, 1a3, 1b1, 1b2, 1b3, 1c1, 1c2, 1c3 . . . Power-transmitting coils (Power-transmitting devices), 4 . . . Control device (Position detecting device, Control device)

What is claimed is:

1. A vehicle electric power supply system that supplies electric power wirelessly to a vehicle that is positioned within an electric power supply area, the system comprising:
a power-receiving device that is provided in the vehicle;
a plurality of power-transmitting devices that are provided at mutually different positions within the electric power supply area;
a position detecting device that detects the position of the power-receiving device within the electric power supply area; and
a control device that, based on detection results from the position detecting device, selects from among the plurality of power-transmitting devices the power-transmitting device that is located in a position that corresponds to the power-receiving device, and then causes power to be supplied wirelessly from the selected power-transmitting device,
wherein, when the position detecting device has detected the positions of a plurality of the power-receiving devices within the electric power supply area, then the control device selects, based on the detection results from the position detecting device, from among the plurality of power-transmitting devices, the respective power-transmitting devices that are placed in positions that correspond to each one of the plurality of power-receiving devices, and causes power to be supplied wirelessly from the selected power-transmitting devices.

2. The vehicle electric power supply system according to claim 1, wherein the control device selects, based on the detection results from the position detecting device, from among the plurality of power-transmitting devices, the respective power-transmitting devices that are located in the closest positions to each one of the plurality of power-receiving devices, and then causes power to be supplied wirelessly from the selected power-transmitting devices.

3. The vehicle electric power supply system according to claim 1, wherein the power-transmitting devices are provided with power-transmitting coils, and the power-receiving device are provided with power-receiving coils, and
the power-transmitting devices transmit power wirelessly by causing their power-transmitting coils to be electromagnetically coupled with the power-receiving coils.

4. The vehicle electric power supply system according to claim 2, wherein the power-transmitting devices are provided with power-transmitting coils, and the power-receiving devices are provided with power-receiving coils, and
the power-transmitting devices transmit power wirelessly by causing their power-transmitting coils to be electromagnetically coupled with the power-receiving coils.

5. The vehicle electric power supply system according to claim 3, wherein the power-transmitting coils and the power-receiving coils are used as the position detecting device.

6. The vehicle electric power supply system according to claim 4, wherein the power-transmitting coils and the power-receiving coils are used as the position detecting device.

* * * * *